United States Patent
Takeda

(10) Patent No.: US 11,579,682 B2
(45) Date of Patent: Feb. 14, 2023

(54) SENSING APPARATUS AND SENSING SYSTEM

(71) Applicant: SEIKO EPSON CORPORATION, Tokyo (JP)

(72) Inventor: Kazuyoshi Takeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/352,791

(22) Filed: Jun. 21, 2021

(65) Prior Publication Data

US 2021/0397244 A1    Dec. 23, 2021

(30) Foreign Application Priority Data

Jun. 22, 2020 (JP) .............................. JP2020-106860

(51) Int. Cl.
*G06F 1/3296* (2019.01)
*H02J 9/00* (2006.01)
*G06F 1/3212* (2019.01)

(52) U.S. Cl.
CPC .......... *G06F 1/3296* (2013.01); *G06F 1/3212* (2013.01); *H02J 9/005* (2013.01)

(58) Field of Classification Search
CPC ........ G06F 1/3296; G06F 1/3212; G06F 1/14; G06F 1/3203; G06F 1/08; G06F 1/12; H02J 9/005
See application file for complete search history.

(56) References Cited

U.S. PATENT DOCUMENTS

2017/0059423 A1* 3/2017 Suzuki .................... G01L 1/225
2017/0331029 A1* 11/2017 Konno .................... H04L 43/50
2018/0173272 A1* 6/2018 Satou ...................... G06F 13/38

FOREIGN PATENT DOCUMENTS

JP    2015-012431    1/2015
WO    2015/019394    2/2015

* cited by examiner

*Primary Examiner* — Kim Huynh
*Assistant Examiner* — Cory A. Latham
(74) *Attorney, Agent, or Firm* — Rankin, Hill & Clark LLP

(57) ABSTRACT

A sensing apparatuses includes a sensor, a processing circuit that acquires sensor output information from the sensor, a communication circuit that transmits transmission information corresponding to the sensor output information, and a clocking circuit that generates time information. The communication circuit receives time information for correction before the processing circuit starts acquiring the sensor output information. The clocking circuit corrects the time information based on the time information for correction received by the communication circuit. The processing circuit starts acquiring the sensor output information based on the corrected time information.

8 Claims, 10 Drawing Sheets

SENSING APPARATUS AND SENSING SYSTEM

The present application is based on, and claims priority from JP Application Serial Number 2020-106860, filed Jun. 22, 2020, the disclosure of which is hereby incorporated by reference herein in its entirety.

BACKGROUND

1. Technical Field

The present disclosure relates to a sensing apparatus, a sensing system, and the like.

2. Related Art

There is a known approach of related art for placing a sensing apparatus in a predetermined position and collecting data detected with a sensor provided in the sensing apparatus via a network. The sensor performs the measurement in a prespecified period when time determined in advance is reached. Placing the sensing apparatus at a structure, for example, a bridge, allows monitoring of the structure.

For example, an RTC (real time clock) is used to set the time. Since an RTC measures the time based on the clock signal from an oscillator or any other component, a time error occurs and is accumulated as the period for which the RTC is used elapses, and it is desirable that the measurement start time is highly accurate considering that the measurement is performed in a desired period. JP-A-2015-012431 discloses an approach that allows a measurement and communication terminal that is a sensing apparatus to obtain absolute time information from a GPS (global positioning system) in a measurement and communication mode, set the absolute time information in an RTC as the current time, then set time at which the measurement and communication terminal is next activated, and shifts the mode of the measurement and communication terminal to a power saving mode.

When the period until the sensing apparatus is next activated is long, the time error produced by the RTC increases, so that the sensing apparatus may not be activated at an appropriate timing. Further, adding a time synchronization function achieved, for example, by GPS, to the sensing apparatus increases the power consumed by the sensing apparatus, and it is therefore difficult to use the thus configured sensing apparatus in a low-power-consumption wireless communication system. The approach disclosed in JP-A-2015-012431 does not consider such a case.

SUMMARY

An aspect of the present disclosure relates to a sensing apparatus including a sensor, a processing circuit that acquires sensor output information from the sensor, a communication circuit that transmits transmission information corresponding to the sensor output information, and a clocking circuit that generates time information. The communication circuit receives time information for correction before the processing circuit starts acquiring the sensor output information. The clocking circuit corrects the time information based on the time information for correction received by the communication circuit. The processing circuit starts acquiring the sensor output information based on the corrected time information.

Another aspect of the present disclosure relates to a sensing system including the sensing apparatus described above and a host system, and the host system predicts a time error that is an error of the time information in the sensing apparatus and activates the power supply circuit of the sensing apparatus at time at least the time error earlier.

DESCRIPTION OF EXEMPLARY EMBODIMENTS

A preferable embodiment of the present disclosure will be described below in detail. It is not intended that the present embodiment described below unduly limits the contents set forth in the appended claims, and all configurations described in the present embodiment are not necessarily essential configuration requirements.

1. System Configuration

Figure 1:
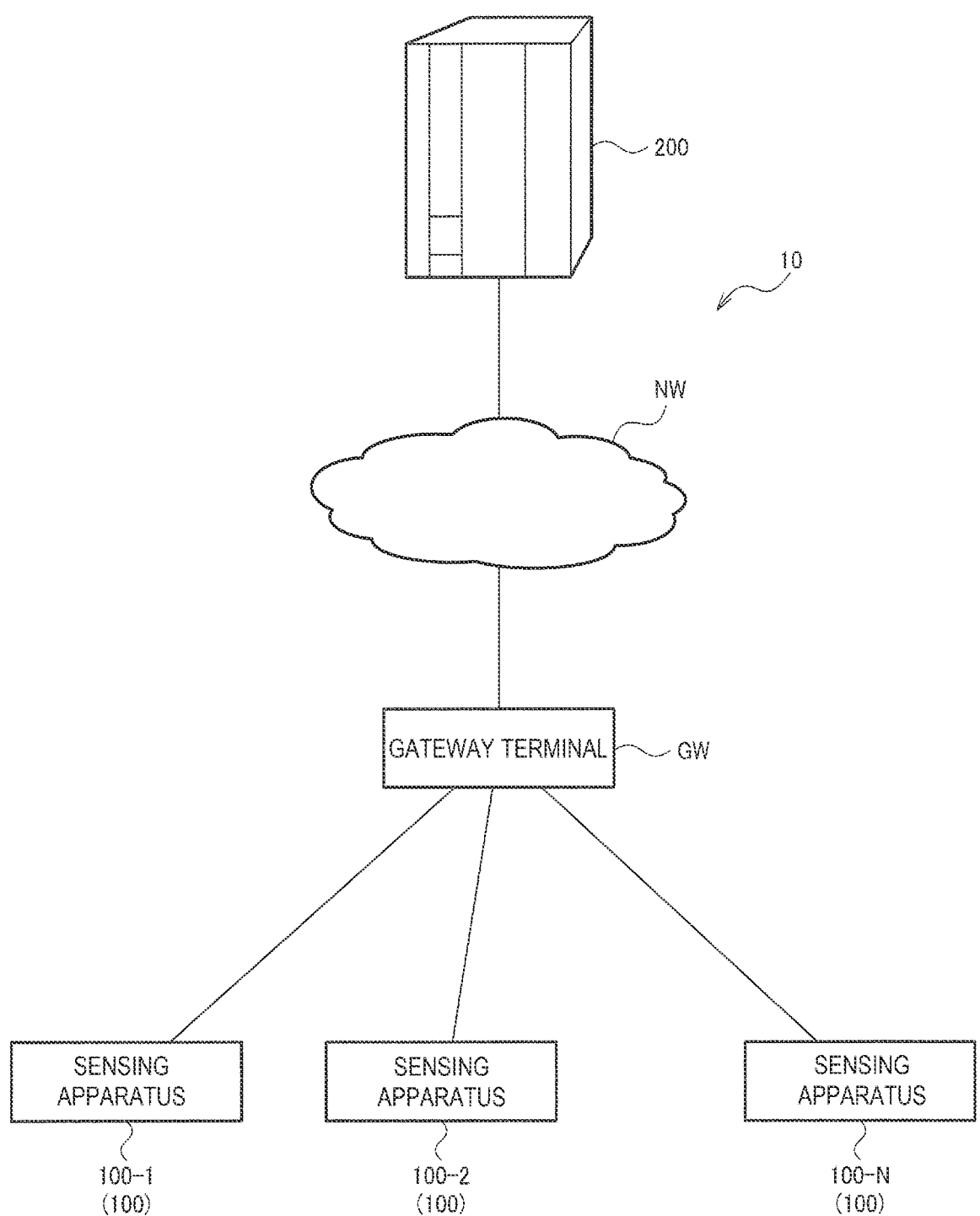
FIG. 1 shows an example of the configuration of a sensing system.

FIG. 1 shows an example of the configuration of a sensing system 10 including sensing apparatuses 100 according to the present embodiment. The sensing system 10 includes the sensing apparatuses 100 and a host system 200, as shown in FIG. 1. FIG. 1 shows by way of example N sensing apparatuses 100, and the sensing system 10 includes a sensing apparatus 100-1, a sensing apparatus 100-2, . . . , and a sensing apparatus 100-N. N is an integer greater than or equal to two.

Figure 2:
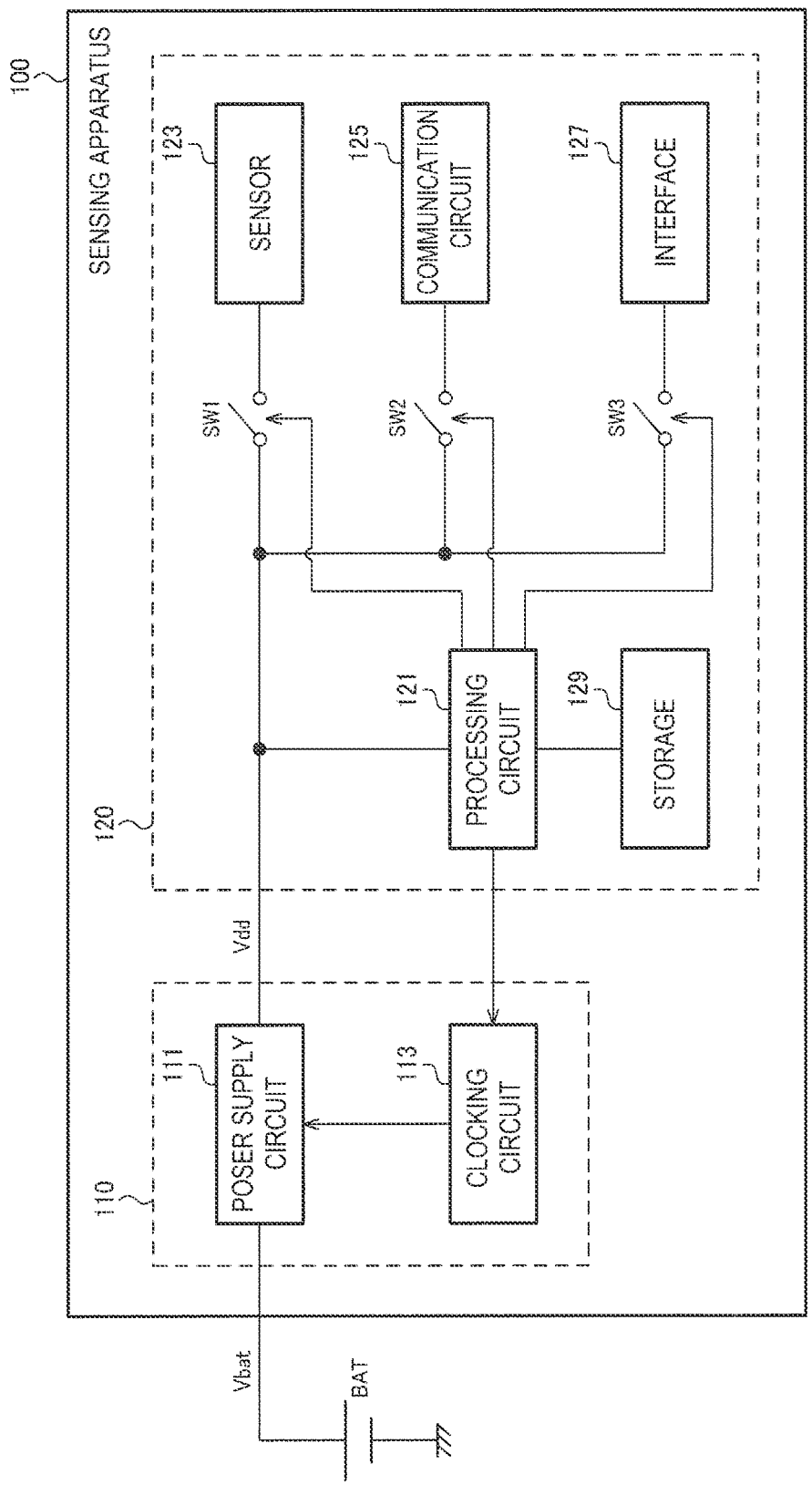
FIG. 2 shows an example of the configuration of a sensing apparatus.

The sensing apparatuses 100 each include a sensor 123 as shown in FIG. 2, and the sensor 123 outputs sensor output information. The sensing apparatuses 100 each transmit transmission information based on the sensor output information to the host system 200 via a network NW. The sensing apparatuses 100 will be described later in detail with reference to FIG. 2.

The sensing apparatuses 100 are coupled to a gateway terminal GW. Communication between the sensing apparatuses 100 and the gateway terminal GW is performed, for example, by using LPWA (low power wide area). A variety of schemes, such as LoRaWAN (registered trademark), Sigfox (registered trademark), and NB-IoT, are known as LPWA, and any of the schemes can be applied in the present embodiment. For example, the gateway terminal GW is a base station that relays the communication and functions as an Internet gateway. The sensing apparatuses 100 and the host system 200 use the gateway terminal GW to perform the communication via the network NW. The network NW in the description is, for example, a public wireless communication network, such as the Internet, and use of a private network or any other network is not inhibited. In the present embodiment, the sensing apparatuses 100 and the host system 200 only need to be capable of performing the communication via the network NW and do not necessarily have the specific configuration shown in FIG. 1.

The host system 200 is a system that manages the plurality of sensing apparatuses 100. The host system 200 manages, for example, measurement start time when the sensing apparatuses 100 each start the measurement and communication start time when the sensing apparatuses 100 each start transmitting the transmission information. The host system 200 acquires and accumulates the transmission information from the plurality of sensing apparatuses 100.

The host system 200 is, for example, a server system. The host system 200 may be formed of one server or may include a plurality of servers. The functions of the host system 200 may be achieved by distributed processing performed by a plurality of apparatuses coupled to each other via a network. In this case, the plurality of apparatuses may each operate as one physical server or as one or more virtual servers. For example, the host system 200 is a cloud system, and the specific configuration thereof can be changed in a variety of manners.

FIG. 2 shows an example of the configuration of each of the sensing apparatuses 100. The sensing apparatuses 100 each include a power supply circuit 111, a clocking circuit 113, a processing circuit 121, the sensor 123, and a communication circuit 125. The sensing apparatuses 100 may each further include an interface 127 and a storage 129. However, the sensing apparatuses 100 do not each necessarily have the configuration shown in FIG. 2, and a variety of variations are conceivable, for example, part of the components is omitted, or another component is added. For example, the interface 127 and the storage 129 may be omitted.

The power supply circuit 111 is a circuit that outputs, when a battery BAT supplies the power supply circuit 111 with battery voltage Vbat, power supply voltage Vdd based on the battery voltage Vbat. In the following description, the battery voltage is simply referred to as Vbat, and the power supply voltage outputted by the power supply circuit 111 is simply referred to as Vdd. The power supply circuit 111 is, for example, a regulator and is in a narrow sense an LDO (low dropout). For example, Vbat ranges from 7 to 8 V, and Vdd is 3.3 V. The voltage values of Vbat and Vdd are, however, not limited to those described above and can be changed in a variety of manners.

The clocking circuit 113 is a circuit that measures time, for example, an RTC (real-time clock). The clocking circuit 113 outputs time information. The time information used herein is information that specifies, for example, a year, a month, a day, an hour, a minute, and a second. The time information may further include information on a day of the week. The clocking circuit 113 includes an oscillation circuit that outputs a clock signal having a predetermined frequency based on an oscillator. The clocking circuit 113 generates, for example, a 1-Hz clock signal by dividing the clock signal outputted by the oscillation circuit and updates the time information described above in synchronization with the 1-Hz clock signal. Circuits having a variety of configurations are known as the RTC, and any of the circuits can be used in the present embodiment.

The processing circuit 121 operates based on Vdd from the power supply circuit 111. The processing circuit 121 acquires the sensor output information from the sensor 123 by controlling the sensor 123. The processing circuit 121 may carryout the process of computing the transmission information based on the sensor output information. The computation process will be described later in details. The processing circuit 121 carries out the process of transmitting the transmission information to the host system 200 by controlling the communication circuit 125. Further, the processing circuit 121 transmits and receives information to and from an external apparatus by controlling the interface 127.

Specifically, the processing circuit 121 performs on/off control of the operation of the sensor 123 by controlling a switch element SW1. The processing circuit 121 further performs on/off control of the operation of the communication circuit 125 by controlling a switch element SW2. The processing circuit 121 may further perform on/off control of the operation of the interface 127 by controlling a switch element SW3. The switch elements SW1 to SW3 are each achieved by a transistor, for example, an FET (field effect transistor) and may instead be formed of a switch having another configuration.

The processing circuit 121 in the present embodiment is formed of the hardware described below. The hardware can include at least one of a circuit that processes a digital signal and a circuit that processes an analog signal. For example, the hardware can be formed of one or more circuit apparatuses or one or more circuit elements mounted on a circuit substrate. The one or more circuit apparatuses are, for example, an IC (integrated circuit), an FPGA (field-programmable gate array), and other components. The one or more circuit elements are, for example, a resistor, a capacitor, and other elements.

The processing circuit 121 may instead be achieved by the processor described below. The sensing apparatuses 100 in the present embodiment each include a memory that stores information and a processor that operates based on the information stored in the memory. The memory is, for example, the storage 129. The information is, for example, a program and a variety of data. The processor includes hardware. The processor is, for example, an MCU (microcontroller unit) or an MPU (microprocessor unit). The processor may, for example, be a CPU (central processing unit), a GPU (graphics processing unit), or a DSP (digital signal processor). The memory may be a semiconductor memory, such as an SRAM (static random access memory) and a DRAM (dynamic random access memory), a register, a magnetic storage apparatus, such as a hard disk drive, or an optical storage apparatus, such as an optical disk apparatus. For example, the memory stores a computer readable instruction, and when the processor executes the instruction, the corresponding function of the processing circuit 121 is achieved in the form of a process. The instruction used herein may be an instruction in an instruction set that forms the program or an instruction that instructs a hardware circuit of the processor to operate in a certain manner.

The sensor 123 detects the state of a target object and outputs the sensor output information as the result of the detection. The sensor 123 is, for example, a three-axis acceleration sensor. In this case, the sensor output information is information containing data on acceleration in each of the three axes. The sensor 123 may instead be a six-axis sensor including a three-axis acceleration sensor and a three-axis gyro sensor. In this case, the sensor output information is information containing data on acceleration in each of the three axes and data on angular velocity around each of the axes. The sensor 123 may still instead be an inclination sensor that detects inclination of the target object, a vibration sensor that detects vibration of the target object, or a temperature sensor that detects the temperature of the target object or the ambient temperature around the target object. In addition to the above, the sensor 123 in the present embodiment can be extended to a variety of other sensors capable of detecting the state of the target object.

The communication circuit 125 is a circuit that performs communication for transmitting the transmission information to the host system 200. In the example shown in FIG. 1, the communication circuit 125 is a wireless communication chip or a wireless communication module that performs communication in compliance with the LPWA standard. As described above, the configuration that allows the sensing apparatuses 100 and the host system 200 to communicate with each other is not limited to the configuration shown in FIG. 1, and the communication circuit 125 may be a wireless communication chip that performs communication in compliance with a standard other than the LPWA standard.

The interface 127 is a communication interface between the sensing apparatuses 100 and an external information processing apparatus. The interface 127 may be a UART (universal asynchronous receiver/transmitter) or another interface. For example, the interface 127 may be an SPI (serial peripheral interface) or an I2C (inter-integrated circuit). The interface 127 is used, for example, in an initialization process described later with reference to FIG. 9.

The storage 129 stores a variety of pieces of information, such as data and programs. The processing circuit 121 operates, for example, by using the storage 129 as a work area. The storage 129 may be an EEPROM (electrically erasable programmable read-only memory) or a flash memory, such as a MONOS (metal-oxide-nitride-oxide-silicon) memory. The storage 129 may be a semiconductor memory, such as an SRAM and a DRAM, a register, a magnetic storage apparatus, or an optical storage apparatus.

The sensing apparatuses 100 according to the present embodiment each include a first circuit 110, which operates based on Vbat, and a second circuit 120, which operates based on Vdd, as shown in FIG. 2. The first circuit 110 includes the power supply circuit 111 and the clocking circuit 113. The second circuit 120 includes the processing circuit 121, the sensor 123, the communication circuit 125, the interface 127, and the storage 129. When the power supply circuit 111 stops outputting Vdd, each portion provided in the second circuit 120 stops operating. More specifically, when Vdd is not supplied, the processing circuit 121 does not operate, so that the sensor 123 or the communication circuit 125 controlled by the processing circuit 121 also does not operate. The power supply circuit 111 can stop supplying Vdd to efficiently reduce the power consumed by the sensing apparatuses 100.

For example, the power supply circuit 111 is a circuit that operates when an enable signal is asserted and stops operating when the enable signal is negated. The enable signal is controlled based on an alarm output from the clocking circuit 113. Specifically, the power supply circuit 111 is enabled when the alarm output from the clocking circuit 113 is on, and the power supply circuit 111 is disabled when the alarm output is off. The thus configured power supply circuit 111 can control whether or not Vdd is outputted, that is, the operation of each portion provided in the second circuit 120 based on the alarm output from the clocking circuit 113.

Figure 3:
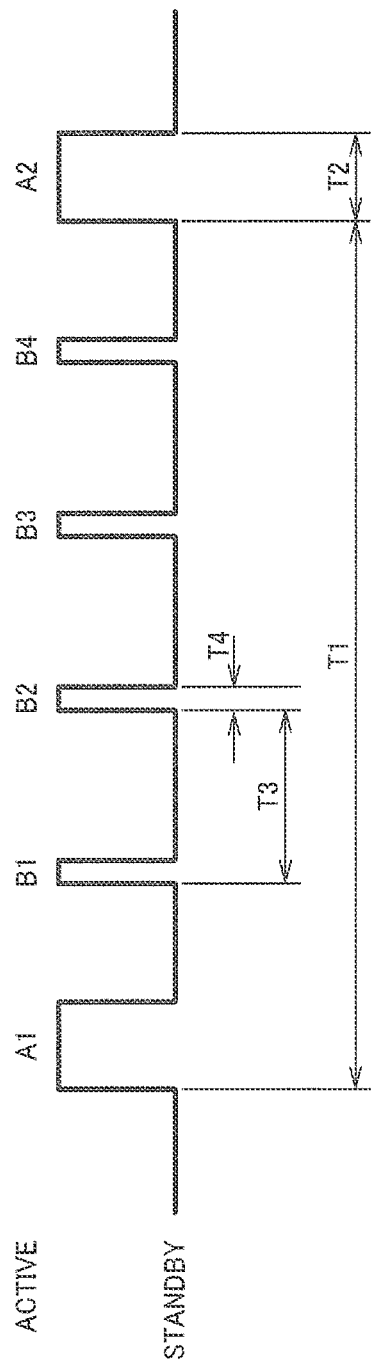
FIG. 3 describes intermittent operation of the sensing apparatus.

FIG. 3 describes basic intermittent operation of the sensing apparatus 100 according to the present embodiment. The horizontal axis of FIG. 3 represents time. In FIG. 3, "ACTIVE" represents the state in which the power supply circuit 111 outputs Vdd, and "STANDBY" represents the state in which the power supply circuit 111 does not output Vdd. An ACTIVE period is a period for which the processing circuit 121 is operable but is not necessarily a period for which each portion of the second circuit 120 always operates. For example, since the sensor 123 and the communication circuit 125 are turned on and off by the processing circuit 121, the ACTIVE period has a period for which neither the sensor 123 nor the communication circuit 125 operates. In the ACTIVE period, the processing circuit 121 may operate in a low power consumption mode in which the power consumption is lower than that in a normal operation mode, as will be described later.

A1 and A2 in FIG. 3 each represent a measurement period. The measurement period is a period for which the sensor 123 performs the measurement and the communication of the transmission information. The measurement period is not limited to A1 or A2. Processes carried out in the measurement period will be described later in detail.

The sensor 123 performs the measurement at the intervals labeled with T1, and one measurement period has a length T2. For example, T1 has a length of about one month, and T2 has a length of about one hour. For example, measurement start time information representing the measurement start time is set in advance in the clocking circuit 113. The measurement start time information used herein is information that can specify a year, a month, a day, an hour, a minute, and a second. For example, the measurement start time is the same time on the first day of every month. The clocking circuit 113 enables the power supply circuit 111 by turning on the alarm output when the current time reaches the measurement start time. After the processes to be carried out in the measurement period are completed, the processing circuit 121 instructs the clocking circuit 113 to turn off the alarm output. The power supply circuit 111 is thus disabled.

The sensing apparatuses 100 can each thus acquire the sensor output information at the intervals labeled with T1 and the transmit transmission information based on the sensor output information to the host system 200. For example, the power consumption can be reduced by causing the sensing apparatuses 100 to operate in the ACTIVE state only in A1, A2 and other measurement periods and causing the sensing apparatuses 100 to operate in the STANDBY state in the other periods. Since Vdd is not supplied to the second circuit 120 in the STANDBY period, the current consumed, for example, by a pullup resistor in a peripheral circuit of the processing circuit 121 can also be reduced. Further, the resistance of the pullup resistor can be set at a large value that provides noise immunity.

When all periods other than the measurement periods are the STANDBY periods, however, the host system 200 can check the states of the sensing apparatuses 100 only once a month. For example, even when any of the sensing apparatuses 100 experiences abnormality, such as failure, the abnormality cannot be detected until the next measurement period. As a result, it is likely that the sensing is not performed properly in the next measurement period and part of the information is lost. Since the sensing apparatuses 100 according to the present embodiment are used to monitor, for example, a structure, loss of part of the information is not preferable.

Monitoring for operating status of the sensing apparatuses 100 may therefore be performed. B1, B2, B3, and B4 in FIG. 3 each represent an operating status monitoring period. The operating status monitoring period is a period for checking whether or not the sensing apparatuses 100 are operating normally. Processes carried out in the operating status monitoring period will be described later in detail.

The monitoring for operating status is performed at the intervals labeled with T3, and one operating status monitoring period has a length T4. T3 is shorter than T1. T4 is shorter than T2. For example, T3 has a length of about one week, and T4 has a length of about several minutes. For example, operating status monitoring time information representing the time when the operating status monitoring starts is set in advance in the clocking circuit 113. The time when the operating status monitoring starts is hereinafter referred to as normal/abnormal monitoring time. The operating status monitoring time information used herein is information that can specify a year, a month, a day, an hour, a minute, and a second. For example, the operating status monitoring time is the same time every Wednesday. The operating status monitoring is therefore not necessarily performed in the operating status monitoring periods B1 to B4 shown in FIG. 3 but is in some cases performed in the operating status monitoring periods B1 to B5, and it is assumed in the description that the normal/abnormal monitoring period B4 is immediately before the measurement periods A1 and A2 and other measurement periods. The clocking circuit 113 enables the power supply circuit 111 by turning on the alarm output when the current time reaches the operating status monitoring time. After the operating status monitoring is completed, the processing circuit 121 instructs the clocking circuit 113 to turn off the alarm output. The power supply circuit 111 is thus disabled.

Performing the operating status monitoring as described above allows appropriate monitoring of the states of the sensing apparatuses 100. Since abnormality of any of the sensing apparatuses 100 is detected at an early stage, the abnormal sensing apparatus 100 can be repaired or otherwise handled by the next measurement period. Since the sensor 123 does not need to perform the measurement for a long period in the operating status monitoring period, the operating status monitoring period can be shorter than the measurement period. The ACTIVE period is therefore not excessively long even when the operating status monitoring is performed, whereby the power consumed by the sensing apparatuses 100 can be reduced.

The measurement start time information representing the measurement start time is set in advance in the clocking circuit 113, as described above, and the clocking performed by the clocking circuit 113 produces a certain time error due to variation in the characteristics of the oscillator, the temperature, aging deterioration, the circuit layout, and other factors. The related-art approach described, for example, in JP-A-2015-012431, in which the sensor 123 performs the measurement at intervals of about one month, which is T1, does not consider the situation in which the time error produced by RTC is accumulated.

The time synchronization approach using GPS described in JP-A-2015-012431 is not preferable because the approach invokes the GPS function, which is not an essential function of the sensing apparatuses 100 and therefore increases the power consumption.

It is conceivable to employ an approach for coupling each of the sensing apparatuses 100 to an NTP (network time protocol) server via the communication circuit 125 and performing the time synchronization but is not suitable because the communication circuit 125 performs communication in compliance with the LPWA standard, which employs a low-speed communication scheme. The reason for this is that the UTC (coordinated universal time) protocol for communication with an NTP server is based on the premise that the uplink communication delay is equal to the downlink communication delay and the UTC protocol is therefore suitable for a high-speed communication scheme. The term "uplink" means the direction from the sensing apparatuses 100 to the NTP server, and the term "downlink" means the direction from the NTP server to the sensing apparatuses 100.

In view of the fact described above, the sensing apparatuses 100 may each make a first period active, the first period being the period before the processing circuit 121 starts acquiring the sensor output information, to allow the sensing apparatus 100 to receive time information for correction for correcting the time from the clocking circuit 113. The receipt of the time information for correction specifically means that the communication circuit 125 wirelessly communicates with the host system 200 and receives the time information for correction from the host system 200. The processing circuit 121 then receives the time information for correction from the communication circuit 125 and carries out the process of correcting the time from the clocking circuit 113. The sensor 123 thus starts the measurement and other actions based on the corrected time, whereby the measurement period can be started at more accurate start time. Further, the time from the clocking circuit 113 can be corrected by only a low-power-consumption wireless communication system with no other functions added thereto, whereby the measurement period can be started at more accurate start time with the power consumption reduced. The first period may be provided separately from the measurement period and the operating status monitoring period described above, or the operating status monitoring period may be used as the first period, and the processes in the operating status monitoring period in the latter case will be described later. The period for which the sensing apparatuses 100 are made active can thus be minimized, whereby the power consumption can be further reduced.

The sensing apparatuses 100 according to the present embodiment each include the sensor 123, the processing circuit 121, the communication circuit 125, and the clocking circuit 113, as described above, as shown in FIG. 2. The processing circuit 121 acquires the sensor output information from the sensor 123. The communication circuit 125 transmits the transmission information corresponding to the sensor output information. The clocking circuit 113 generates the time information. The clocking circuit 113 can thus communicate a physical quantity regularly measured by the sensor to an external apparatus via the communication circuit 125, whereby the state of an object that is the target of the sensor can be remotely grasped. Further, the communication circuit 125 receives the time information for correction before the processing circuit 121 starts acquiring the sensor output information. The clocking circuit 113 then corrects the time information based on the time information for correction received by the communication circuit 125. The processing circuit 121 then starts acquiring the sensor output information based on the corrected time information. The time from the clocking circuit 113 can thus be corrected by only a low-power-consumption wireless communication system with no other functions added thereto, whereby the measurement period can be started at more accurate start time with the power consumption reduced. The approach of the present embodiment allows the period for which the sensing apparatuses 100 communicate with the host system 200 to be started at more accurate start time, whereby occurrence of collision described later can be prevented. The collision will be described later.

The sensing apparatuses 100 according to the present embodiment each further include the power supply circuit 111, as shown in FIG. 2. The power supply circuit 111 supplies the processing circuit 121 with the power supply voltage Vdd based on the battery voltage Vbat from the battery BAT. The clocking circuit 113 then operates by using the battery voltage Vbat, and the power supply circuit 111 is activated by an instruction from the clocking circuit 113. For example, the enable signal for the power supply circuit 111 is controlled based on the alarm output from the clocking circuit 113, as described above. The processing circuit 121 then starts acquiring the sensor output information after the power supply voltage Vdd is supplied from the activated power supply circuit 111. The period for which the processing circuit 121 operates is thus minimized, whereby the period for which the sensor 123 performs the measurement can be started at more accurate start time with the power consumed by the sensing apparatuses 100 reduced. The sensing apparatuses 100 can thus be driven with the battery for a long period. The structure of the sensing apparatuses 100 can thus be simplified, whereby the sensing apparatuses 100 can be readily installed at a structure, such as a bridge.

Figure 4:
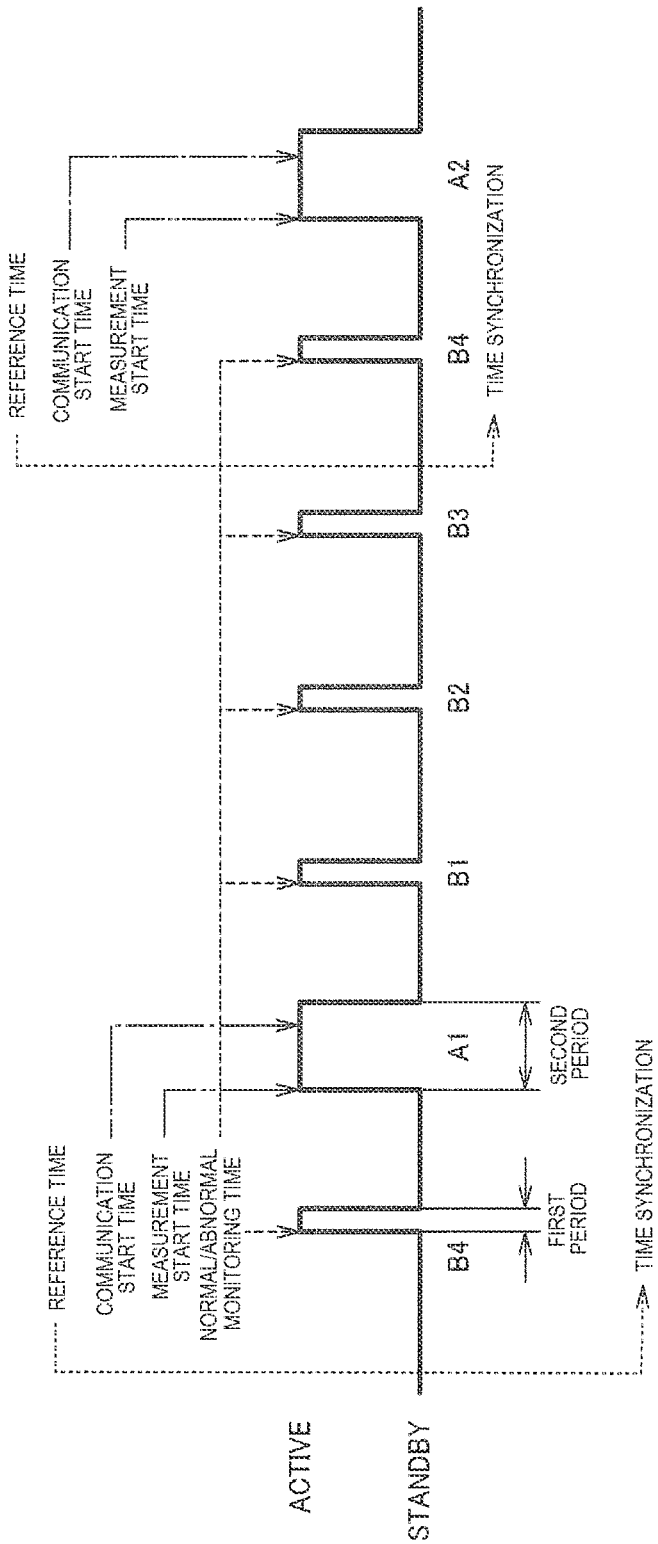
FIG. 4 describes an example of the relationship between the intermittent operation of the sensing apparatus and the timing of time synchronization.

2. Details of Processes 2.1 Example of Process of Performing Time Synchronization in Operating Status Monitoring Period Specific examples of processes and the like in the present embodiment will next be described. FIG. 4 describes an example of the relationship between the intermittent operation of the sensing apparatuses 100 and the timing of the time synchronization. In the example shown in FIG. 4, the operating status 1 monitoring period B4 immediately before the measurement period is the first period, and the time synchronization is performed in the first period. The communication is performed in the measurement periods A1, A2, and other measurement periods, which are each a second period.

Figure 5:
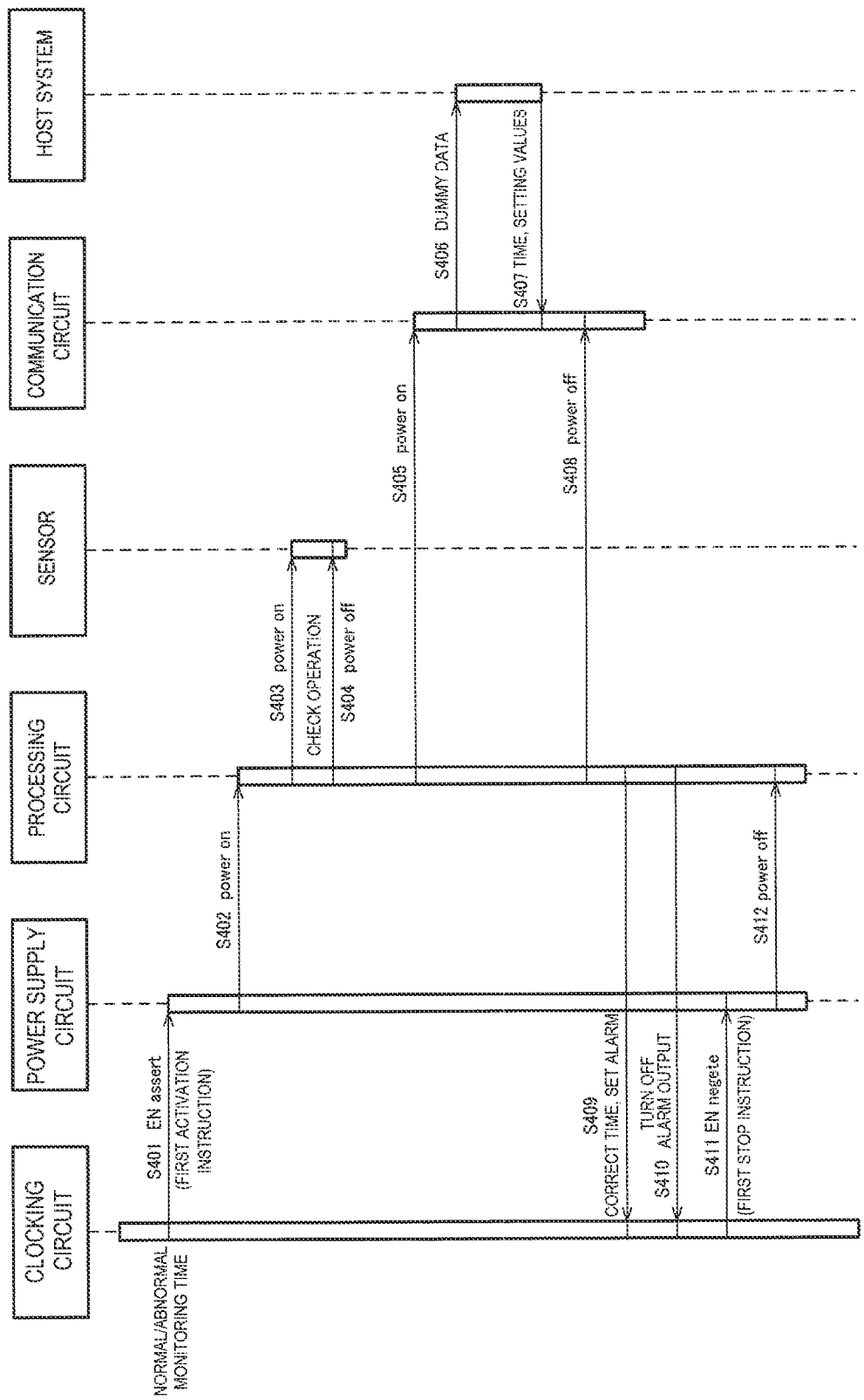
FIG. 5 describes the procedure of processes in a first period.
Figure 6:
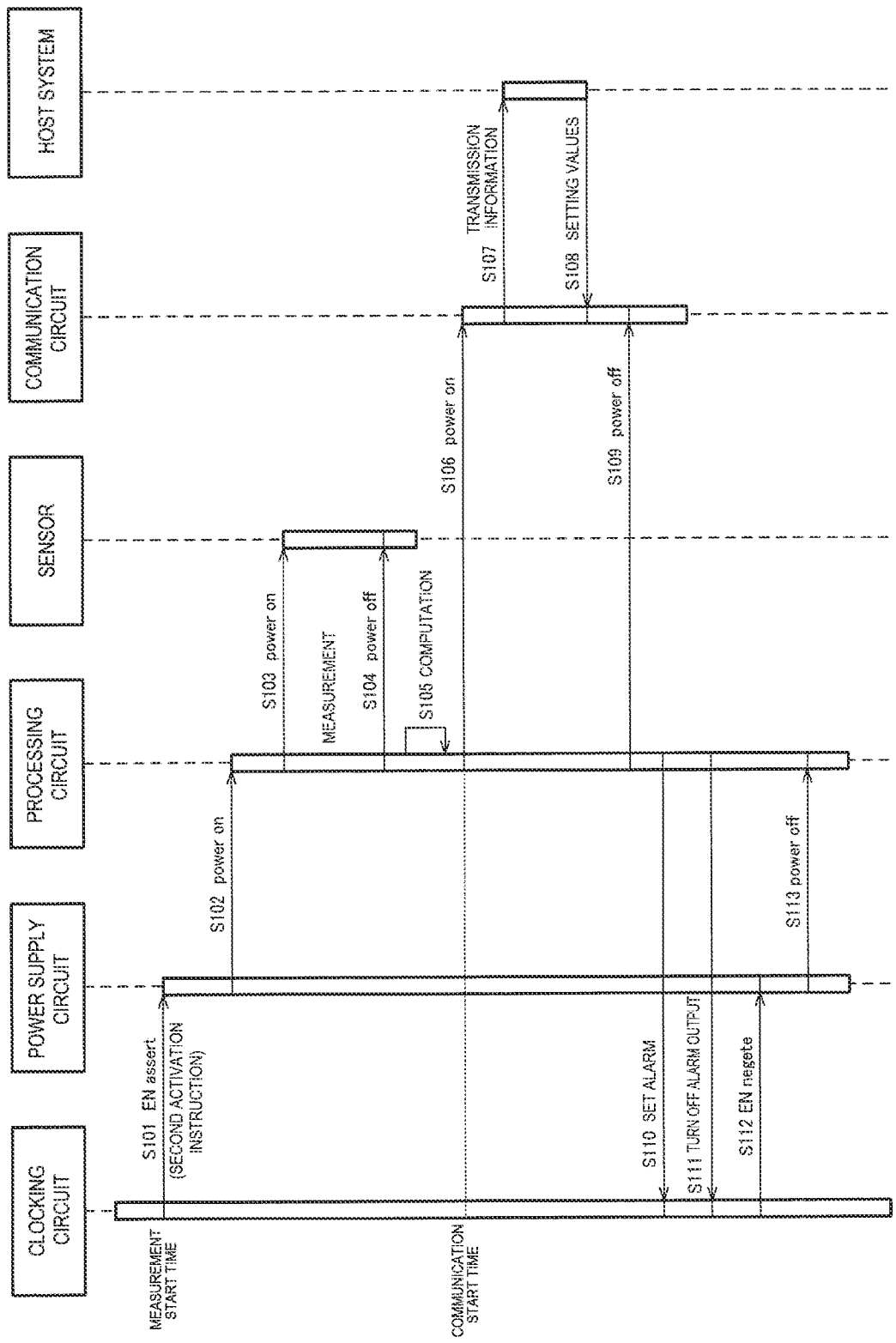
FIG. 6 describes the procedure of processes in a second period.

FIG. 5 describes the procedure of the processes in the first period in FIG. 4, and FIG. 6 describes the procedure of the processes in the measurement period, which is the second period. It is assumed that the initialization process described later with reference to FIG. 9 has been completed and the measurement start time has been set in the clocking circuit 113 before the processes in the first and second periods are carried out. It is further assumed that the sensing apparatuses 100 each have acquired the operating status monitoring time information and the communication start time information. Before the start of the processes shown in FIGS. 5 and 6, the sensing apparatuses 100 operate in the STANDBY state in FIG. 3, and Vbat from the battery BAT is supplied, but only the clocking circuit 113 is in operation. It is noted that FIG. 5 diagrammatically shows the procedure of the processes, and that the length in the vertical axis direction does not represent a specific length of time. The same holds true for FIGS. 6 and 8 described later.

The processes in FIG. 5 will first be described. The clocking circuit 113 carries out the process of comparing the time held thereby with the operating status monitoring time indicated by the operating status monitoring time information. The clocking circuit 113 turns on the alarm output when the current time reaches the operating status monitoring time. Specifically, in step S401, the clocking circuit 113 asserts the enable signal for the power supply circuit 111. In step S402, the power supply circuit 111 turns on the processing circuit 121 by supplying the processing circuit 121 with Vdd. In other words, the power supply circuit 111 is activated by a first activation instruction from the clocking circuit 113 and supplies the processing circuit 121 with the power supply voltage Vdd in the first period.

In step S403, the processing circuit 121 turns on the sensor 123 to cause the sensor 123 to start the measurement. In the normal/abnormal monitoring period, the processing circuit 121 only needs to ascertain that the sensor 123 is outputting information, and the sensor 123 has a low necessity of continuing the measurement for a long period. Therefore, for example, the processing circuit 121 turns off the sensor 123 to terminate the measurement in step S404 at the timing at which the processing circuit 121 ascertains that the sensor output information is outputted. The processing circuit 121 may generate transmission information having an amount large enough to allow the computation process described later to be carried out in step S105 in FIG. 6.

In the operating status monitoring period, the processes in steps S403 and S404 may be omitted. In this case, abnormality of the sensor 123 cannot be detected, but the operation of the power supply circuit 111, the clocking circuit 113, the processing circuit 121, the communication circuit 125, and other circuits can be checked.

After the process in step S404, the processing circuit 121 does not wait or transition to the low power consumption mode but turns on the communication circuit 125 to cause the communication circuit 125 to start transmitting the operating status monitoring information in step S405. For example, in step S406, the communication circuit 125 transmits dummy data having an arbitrary content to the host system 200. The operating status monitoring information may be a specific data string representing the operating status monitoring. The processing circuit 121 may carry out the process of transitioning to the low power consumption mode and the process of returning thereto before the process in step S405. The low power consumption mode will be described later.

In step S407, the communication circuit 125 receives information from the host system 200. The received information is, for example, reference time information and setting values. The setting values include the measurement start time information and the communication start time information and may further include other pieces of information. The reference time information is information for correcting the time information outputted by the clocking circuit 113, in other words, the time information for correction. For example, the host system 200 can acquire standard time via the network NW, such as the Internet. The host system 200 transmits information based on the standard time as the reference time information to the sensing apparatuses 100. That is, the communication circuit 125 receives the time information for correction in the first period. Thereafter, in step S408, the processing circuit 121 turns off the communication circuit 125 to terminate the communication.

The communication start time information may vary among the sensing apparatuses 100. The collision in the communication can thus be avoided. The collision occurs when the plurality of sensing apparatuses 100 communicate with the host system 200 as shown in FIG. 1 and two or more sensing apparatuses 100 simultaneously transmit transmission information. In particular, in the communication between the sensing apparatuses 100 and the gateway terminal GW, a protocol that does not perform sufficient retransmission control may be used. Therefore, when the plurality of sensing apparatuses 100 simultaneously transmit information to the gateway terminal GW, the information may be lost due to the collision. Further, the collision not only occurs in the communication between the sensing apparatuses 100 and a relay apparatus, such as the gateway terminal GW, but may occur in some cases when the host system 200 receives data.

Returning to FIG. 5, the description resumes. In step S409, the processing circuit 121 sets the clocking circuit 113 based on the information received by the communication circuit 125 in step S407. That is, the clocking circuit 113 corrects the time information based on the time information for correction in the first period.

In step S410, the processing circuit 121 turns off the alarm output from the clocking circuit 113. The clocking circuit 113 thus negates the enable signal for the power supply circuit 111 in step S411. When the enable signal is negated, the power supply circuit 111 stops outputting Vdd based on Vbat. Specifically, in step S412, the power supply circuit 111 turns off the processing circuit 121 by stopping supplying the processing circuit 121 with Vdd. That is, the power supply circuit 111 stops operating upon receipt of a first stop instruction from the clocking circuit 113.

Processes in the second period will next be described with reference to FIG. 6. First, the clocking circuit 113 compares the time information held thereby with the measurement start time indicated by the measurement start time information. The clocking circuit 113 turns on the alarm output when the current time reaches the measurement start time. Specifically, in step S101, the clocking circuit 113 asserts the enable signal for the power supply circuit 111.

When the enable signal is asserted, the power supply circuit 111 outputs Vdd based on Vbat. Specifically, in step S102, the power supply circuit 111 turns on the processing circuit 121 by supplying the processing circuit 121 with Vdd. In other words, the power supply circuit 111 is activated by a second activation instruction from the clocking circuit 113 and supplies the processing circuit 121 with the power supply voltage Vdd in the second period.

In step S103, the processing circuit 121 turns on the sensor 123 to cause the sensor 123 to start the measurement. Specifically, the processing circuit 121 turns on the switch element SW1 to start supplying the sensor 123 with Vdd. The sensor 123 operates based on Vdd to output the sensor output information to the processing circuit 121.

One-bout measurement performed by the sensor 123 continues for, for example, one hour. Therefore, when one hour has elapsed from the start of the measurement, the processing circuit 121 turns off the sensor 123 to terminate the measurement in step S104. Specifically, the processing circuit 121 turns off the switch element SW1 to stop supplying the sensor 123 with Vdd.

Thereafter, in step S105, the processing circuit 121 carries out the computation process based on the sensor output information from the sensor 123 to generate transmission information. The transmission information is, for example, information that serves as an index representing whether or not abnormality has occurred in a target object under the sensing.

For example, the processing circuit 121 acquires time-series data on acceleration as the sensor output information from the sensor 123. In other words, the processing circuit 121 acquires the sensor output information in the second period. The processing circuit 121 performs frequency conversion, such as Fourier transform, on the time-series data. For example, the processing circuit 121 carries out the process of determining a peak frequency and the spectral intensity at the peak frequency as the transmission information based on the result of the Fourier transform. The processing circuit 121 may evaluate whether or not abnormality has occurred by comparing a normal-time peak frequency and spectral intensity acquired in advance with the peak frequency and the spectral intensity determined by the computation. The transmission information in this case is information representing whether or not abnormality has occurred.

The processing circuit 121 may instead carry out the process of determining the velocity or displacement of the target object by integrating the acceleration data. The transmission information is, for example, the displacement of a given portion of the target object. The processing circuit 121 may evaluate whether or not abnormality has occurred by comparing the determined displacement with a given threshold.

Instead, the processing circuit 121 may determine, as the transmission information, ratio information representing the ratio between the maximum amplitude of the acceleration in a bridge axis direction and the maximum amplitude of the acceleration in a direction perpendicular to the bridge axis. The ratio information is known to correlate with the natural frequency of the target object and is therefore information suitable for monitoring of the target object. There is also a known approach using a power spectrum of regular slight movement caused by a natural phenomenon, such as wind, as the index that correlates with the natural frequency, and the processing circuit 121 in the present embodiment may compute information based on the power spectrum as the transmission information.

The processing circuit 121 may carry out, as pre-processing of the process described above, the process of extracting information corresponding to a movement period for which a moving body, such as a train or a car, moves from the sensor output information acquired by the one-hour measurement. For example, acceleration has a large amplitude when the moving object is moving and a small amplitude when no moving object is present. The processing circuit 121 can therefore evaluate whether or not a moving body is present based on the amplitude of the acceleration. The processing circuit 121 determines the period for which the moving body is continuously present as one movement period. When a plurality of moving bodies move in one hour, a plurality of movement periods are set. The above process, such as the Fourier transform and the integration, is performed on a movement period basis. The transmission information may be a set of the indexes determined in each movement period. The processing circuit 121 may instead determine the statistic of the indices determined in each movement period and use the statistic as the transmission information. The statistic used herein may be an average value, a maximum, or another statistic. The computation process in step S105 may be the process of extracting information on the movement period from the sensor output information.

Referring back to FIG. 6, the description resumes. The computation process in step S105 generates the transmission information to be transmitted. It is, however, noted in the approach of the present embodiment that the timing at which the computation of the transmission information is completed does not always correspond to the communication start time. Therefore, although not shown, the processing circuit 121 waits after the completion of the computation process in step S105 but before the communication start time indicated by the communication start time information. The processing circuit 121 may acquire the current time used to evaluate whether or not the communication start time has been reached from the clocking circuit 113. The processing circuit 121 may instead acquire the time information from the clocking circuit 113 at the time of the activation of the processing circuit 121 and measure the current time afterward, for example, by using the operating clock signal of the processing circuit 121 itself. The communication start time may also be set in the clocking circuit 113, and the alarm signal may be outputted from the clocking circuit 113 to the processing circuit 121 when the current time reaches the communication start time. Although not shown or otherwise illustrated, the processing circuit 121 may operates in the low power consumption mode from the end of the computation process in step S105 to the communication start time. Instead, the processing circuit 121 may operate in the low power consumption mode for a fixed period after step S104 and then carry out the computation process in step S105 after returning to the normal operation mode. The power consumed by the sensing apparatuses 100 can thus be reduced. The low power consumption mode will be described later.

Thereafter, when the current time reaches the communication start time, the processing circuit 121 turns on the communication circuit 125 to cause the communication circuit 125 to start transmitting the transmission information in step S106. Specifically, the processing circuit 121 turns on the switch element SW2 to start supplying the communication circuit 125 with Vdd. In step S107, the communication circuit 125 operates based on Vdd to transmit the transmission information to the host system 200. As described above with reference to FIG. 1, the communication with the host system 200 may, for example, be the communication via the gateway terminal GW.

The communication circuit 125 in the present embodiment may be capable of receiving the information from the host system 200 in a given receipt period after the transmission information is transmitted. Suppression of the receipt outside the receipt period allows the time for which the communication circuit 125 operates to be shortened, whereby the power consumption can be reduced.

In step S108, the communication circuit 125 receives the setting values from the host system 200. The setting values received in step S108 include, for example, the next operating status monitoring time information and may further include other pieces of information. In step S108 in FIG. 5, the communication circuit 125 does not need to receive the reference time information from the host system 200 so that no receipt process is shown but may receive the reference time information.

After the receipt period ends, the processing circuit 121 turns off the communication circuit 125 to terminate the communication in step S109. Specifically, the processing circuit 121 turns off the switch element SW2 to stop supplying the communication circuit 125 with Vdd.

In step S110, the processing circuit 121 sets the clocking circuit 113 based on the information received by the communication circuit 125 in step S108. Specifically, the processing circuit 121 corrects the time information from the clocking circuit 113 based on the reference time information. Further, the processing circuit 121 carries out the process of setting the measurement start time information and the operating status monitoring time information in the clocking circuit 113. The clocking circuit 113 can thus turn on the alarm output at the measurement start time or the operating status monitoring time. The measurement start time or the normal/abnormal monitoring time set at this point is information for starting the next measurement period or operating status monitoring period and the following measurement periods or operating status monitoring periods, as will be described later.

In step S111, the processing circuit 121 turns off the alarm output from the clocking circuit 113. The clocking circuit 113 thus negates the enable signal for the power supply circuit 111 in step S112. When the enable signal is negated, the power supply circuit 111 stops outputting Vdd based on Vbat. Specifically, the power supply circuit 111 turns off the processing circuit 121 by stopping supplying Vdd in step S113.

The procedure of the processes in the measurement period and that in the operating status monitoring period differ from each other, as shown in FIGS. 5 and 6. The processing circuit 121 therefore evaluates whether the current time falls within the measurement period or the operating status monitoring period when the power supply circuit 111 starts supplying Vdd and the processing circuit 121 starts operating. The processing circuit 121 then carries out the process of determining whether to carryout the processes shown in FIG. 5 or the processes shown in FIG. 6 based on the result of the evaluation. Since the measurement start time information and the operating status monitoring time information have been received before the processing circuit 121 is activated, the processing circuit 121 can determine whether the current time falls within the measurement period or the operating status monitoring period based on the received information and the current time.

As described above, the power supply circuit 111 is activated by the first activation instruction from the clocking circuit 113 and supplies the processing circuit 121 with the power supply voltage Vdd in the first period, the communication circuit 125 receives the time information for correction in the first period, the clocking circuit 113 corrects the time information based on the time information for correction in the first period, and the power supply circuit 111 stops operating in response to the first stop instruction from the clocking circuit 113. The power supply circuit 111 is activated by the second activation instruction from the clocking circuit 113 and supplies the processing circuit 121 with the power supply voltage Vdd in the second period, and the processing circuit 121 acquires the sensor output information in the second period. The configuration described above allows the second period in which the sensor output information is acquired to be started at more accurate start time and the period in which the power supply circuit 111, the processing circuit 121, and other circuits are activated to be minimized, whereby the power consumption can be reduced. When the accuracy of the start time of the second period decreases, the accuracy of the communication start time also decreases, so that the collision described above may occur. According to the approach of the present embodiment, however, the communication can be started at more accurate communication start time, whereby the occurrence of the collision can be prevented.

The operating status monitoring period B4 has been described as the first period, and any of the operating status monitoring periods B1 to B3 may be the first period, or all the operating status monitoring periods may be the first period. In other words, the first period may be a operating status monitoring period that is a period for checking whether or not the sensing apparatuses are operating normally. It is therefore unnecessary to increase the number of periods for which the sensing apparatuses 100 are made active, whereby the second period in which the sensor output is acquired can be started at more accurate start time by using a minimum period necessary for the activation of the sensing apparatuses 100.

Further, in the present embodiment, the communication circuit 125 receives the measurement start time information, and the clocking circuit 113 activates the power supply circuit 111 at the measurement start time specified by the measurement start time information. The power supply circuit 111, the processing circuit 121, and other circuits can thus remain inactivated before the measurement start time, whereby the power consumed by the sensing apparatuses 100 can be reduced.

The operating status monitoring can be achieved by carrying out the same processes described above also in any of the operating status monitoring periods B1 to B3, as described above. However, since the operating status monitoring periods B1 to B3 are not each a operating status monitoring period immediately before the measurement starts, part of the processes to be carried out therein may be omitted. Part of the processes include, for example, the process of receiving the reference time information from the host system 200, as in step S407 in FIG. 5, and the process in which the processing circuit 121 sets the clocking circuit 113 based on the information received by the communication circuit 121 in step S407, as in step S409 in FIG. 5.

2.2 Example of Process of Performing Time Synchronization Before Measurement Starts The FIGS. 4 to 6 described above show the case where the operating status monitoring period B4 is the first period, but time lag of about one week may occur in the period from the first period to the second period, in other words, in the period from the operating status monitoring period B4 to any of the measurement period A1, A2 and other measurement periods, as described above. The description of the time synchronization in FIGS. 4 to 6 does not take into consideration the case where the time error produced by the clocking circuit 113 is accumulated due to the time lag.

Figure 7:
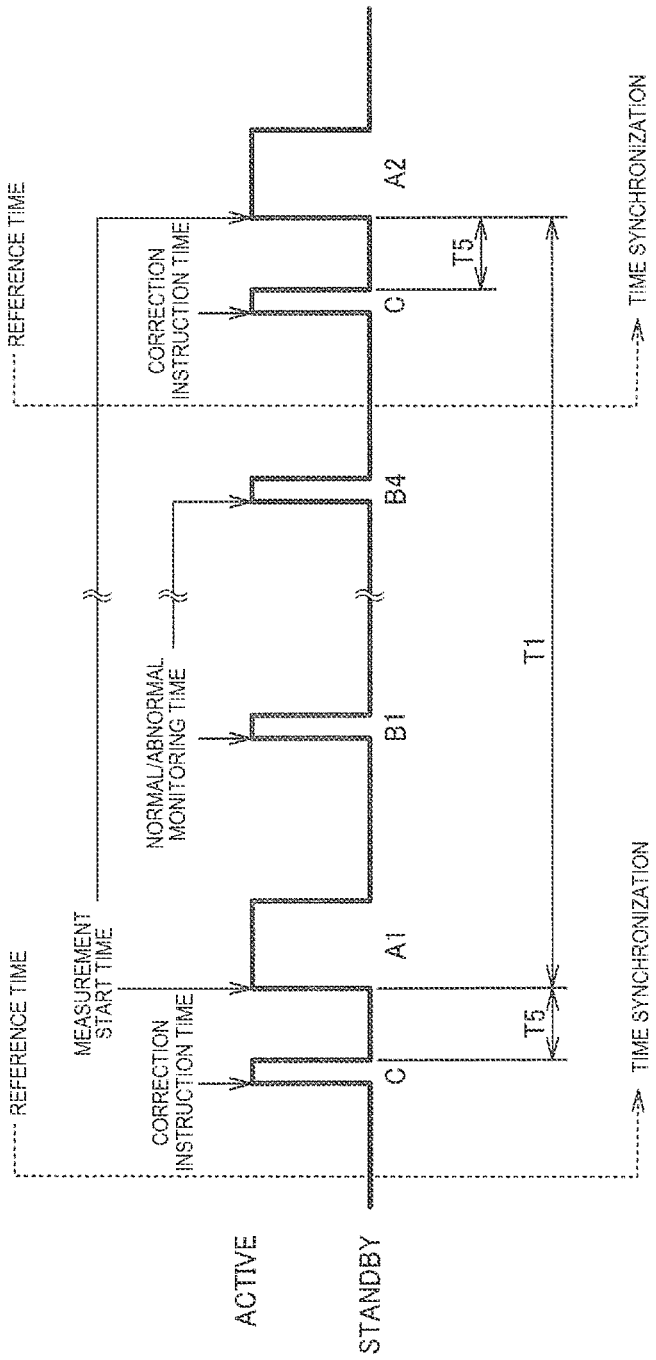
FIG. 7 describes another example of the relationship between the intermittent operation of the sensing apparatus and the timing of the time synchronization.

In view of the fact described above, the time synchronization in the present embodiment may be performed at correction instruction time before the measurement start time. FIG. 7 describes another example of the relationship between the intermittent operation of the sensing apparatuses 100 and the timing of the time synchronization. FIG. 7 differs from FIG. 4 in that a period C, which starts at the correction instruction time, is added and the time synchronization is performed in the period C. A period T5 between the period C and any of the measurement periods A1, A2 and other measurement periods is a period longer than the time error that can be accumulated in the clocking circuit 113. The sensing apparatuses 100 can thus reliably start the measurement in the measurement periods A1, A2 and other measurement periods after the time synchronization is performed in the period C. It is noted that FIG. 7 is a diagrammatic view, and that the length in the horizontal axis direction does not necessarily coincide with a specific length of time.

Figure 8:
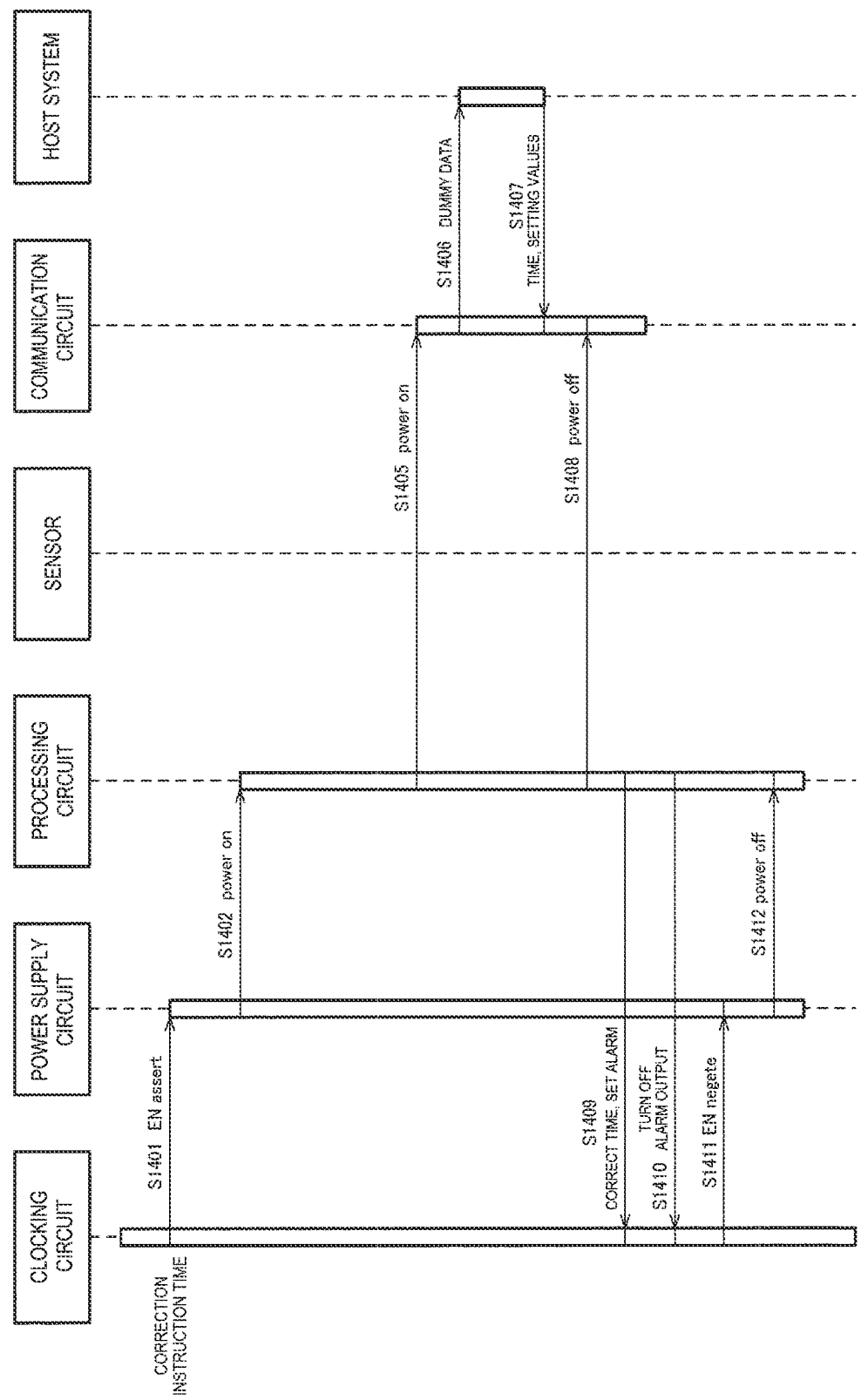
FIG. 8 describes the procedure of processes that start at correction instruction time.

FIG. 8 describes an example of the procedure of processes in the period C. It is assumed that the initialization process described later with reference to FIG. 9 has been completed and the correction instruction time has been set in the clocking circuit 113 before the processes in FIG. 8 are carried out. Comparison between FIGS. 8 and 5 shows that the processes in the period C conform to the processes in the first period, in other words, the processes in the operating status monitoring period. However, in the period C in FIG. 8, information necessary for the time synchronization in the sensing apparatuses 100 only needs to be acquired, so that part of the processes shown in FIG. 5 can be omitted, but not necessarily.

The clocking circuit 113 compares the time held thereby with the correction instruction time indicated by the time information. The clocking circuit 113 turns on the alarm output when the current time reaches the correction instruction time. Specifically, in step S1401, the clocking circuit 113 asserts the enable signal for the power supply circuit 111, as in step S401 in FIG. 5. Thereafter, in step S1402, the power supply circuit 111 turns on the processing circuit 121 by supplying the processing circuit 121 with Vdd, as in step S402 in FIG. 5. In the processes in FIG. 8, since it is unnecessary to check if the sensor 123 has experienced abnormality, processes corresponding to those in steps S403 and S404 in FIG. are omitted. Similarly, the process of checking the operation of the power supply circuit 111, the clocking circuit 113, the processing circuit 121, the communication circuit 125, and other circuits is omitted.

In step S1405, the communication circuit 125 is turned on and caused to start transmitting the correction instruction information, as in step S405 in FIG. 5. For example, in step S1406, the communication circuit 125 transmits dummy data having an arbitrary content to the host system 200, for example, as in step S406 in FIG. 5. The correction instruction information may be a specific data string representing a correction instruction.

In step S1407, the communication circuit 125 receives the reference time information and the setting values from the host system 200, as in step S407 in FIG. 5. Thereafter, in step S1408, the processing circuit 125 turns off the communication circuit 125 to terminate the communication, as in step S408 in FIG. 5.

In step S1409, the processing circuit 121 sets the clocking circuit 113 based on the reference time information received by the communication circuit 125 in step S1407 described above, as in step S409 in FIG. 5. The subsequent steps S1410 to S1412 are the same as steps S410 to S412 in FIG. 5.

As described above, at the correction instruction time, the power supply circuit 111 may be activated by the instruction from the clocking circuit 113, the communication circuit 125 may receive the time information for correction after the power supply circuit 111 is activated, the clocking circuit 113 may correct the time information based on the time information for correction, and the processing circuit 121 may acquire the sensor output information after the clocking circuit 113 corrects the time information.

The time synchronization can thus be performed immediately before the sensing apparatuses 100 start the measurement, whereby the period for which the sensing apparatuses 100 perform the measurement can be started at more accurate start time.

Thereafter, the sensing apparatuses 100 carry out the processes in FIG. 8 and then carry out the processes that conform to the exemplary processes shown in FIG. 6. It should, however, be noted that the sensing apparatuses 100 need to store the next correction instruction time again.

The approach of the present embodiment may be applied to the sensing system 10 including the sensing apparatuses 100 and the host system 200. Further, the host system 200 in the present embodiment may predict the time error of the time information in the sensing apparatuses 100 and activate the power supply circuit 111 of each of the sensing apparatuses 100 at time at least the predicted time error earlier. Specifically, the host system 200 predicts an error that occurs in the clocking circuit 113 of each of the sensing apparatuses 100 and determines correction instruction time from the measurement start time in consideration of the time error. The host system 200 can achieve the activation of the sensing apparatuses 100 by incorporating the measurement start time and the correction instruction time based on the prediction described above in the setting values transmitted to the communication circuit 125 in step S108 in FIG. 6. The setting values may contain the communication start time based on the prediction described above.

In other words, the configuration in which the setting values contain the measurement start time means that the communication circuit 125 in each of the sensing apparatuses 100 receives the measurement start time information and the clocking circuit 113 activates the power supply circuit 111 at the measurement start time specified by the measurement start time information also in the examples shown in FIGS. 7 and 8.

Therefore, the time synchronization in the clocking circuit 113 can be reliably performed before the sensor 123 starts the measurement, and the period from the time synchronization to the start of the measurement can be minimized, whereby the power consumed by the sensing apparatuses 100 can be reduced.

2.3 Other Examples of Processes

A variety of changes can be made to the processes carried out by the sensing apparatuses 100 and the sensing system 10 according to the present embodiment. For example, in the exemplary processes described above, provided that the period from the time synchronization to the start of the measurement can be shortened, it cannot be always said that it is preferable to perform the control in which the communication start time is reached shortly after the power supply circuit 111 is shut down at the end of the time synchronization process and the clocking circuit 113 turns on the alarm output.

Therefore, in the present embodiment, the processing circuit 121 may operate in the low power consumption mode after the clocking circuit 113 corrects the time information but before the processing circuit 121 starts acquiring the sensor output information. To this end, although not shown, the processing circuit 121 specifically transitions to the low power consumption mode after carrying out the processes in step S409 in FIG. 5 and step S1409 in FIG. 8, returns to the normal operation mode before the subsequent measurement start time, and then carries out the processes in step S103 and the subsequent steps in FIG. 6. The processing circuit 121 may transition to the low power consumption mode separately into multiple times after the time synchronization but before the measurement start time.

The low power consumption mode used herein is an operation mode in which power consumption is lower than that in the normal operation mode. For example, when the operating clock of the processing circuit 121 in the normal operation mode has a first frequency, and the operating clock of the processing circuit 121 in the low power consumption mode has a second frequency, the second frequency is lower than the first frequency. Instead, when the processing circuit 121 is formed of a plurality of circuit blocks, the normal operation mode is a mode in which all the circuit blocks operate, and the low power consumption mode is an operation mode in which at least one circuit block is not in operation. Still instead, the low power consumption mode may be an operation mode in which the frequency of the clock signal supplied to at least one of the circuit blocks is lower than that in the normal operation mode. As described above, the low power consumption mode only needs to be a mode in which the power consumption relatively decreases, and the specific operation in the low power consumption mode can be changed in a variety of manners.

It should be noted that the processing circuit 121 returns to the normal operation mode at a timing before the communication start time. Therefore, for example, the host system 200 may further incorporate normal operation mode return time as well as the measurement start time and the correction instruction time described above in the setting values to be transmitted to the communication circuit 125 in step S108 in FIG. 6. Steps S410 to S412 in FIG. 5 or steps S1410 to S1412 in FIG. 8 and steps S101 and S102 in FIG. 6 can thus be omitted, whereby the processes from the time synchronization to the start of the measurement can be simplified, and the power consumption can be reduced.

Further, in the intermittent operation in FIG. 4, one week elapses in the period from the operating status monitoring period B4 to any of the measurement period A1, A2 and other measurement periods, as described above. For example, the host system 200 may be configured to be capable of adjusting the day to which the operating status monitoring period belongs to the day before the day to which the measurement period belongs. In other words, in the sensing system 10 according to the present embodiment, the host system 200 may adjust the day to which the operating status monitoring period belongs to the day before the day to which the measurement period belongs and transmits the time information for correction in the operating status monitoring period. For example, in FIG. 4, the day to which the measurement period belongs is the first day of each month, and the day to which the operating status operation monitoring period belongs is every Wednesday. In this case, however, the day before the day to which the measurement period belongs is not always Wednesday. Therefore, for example, when the host system 200 transmits the setting values to the communication circuit 125 in step S108 in FIG. 6, the host system 200 may determine the day of the week to which the next measurement start time information belongs and compute the setting values in such a way that the day of the week before the determined day of the week is the day of the week in the operating status monitoring period. For example, when the day to which the next measurement start time belongs is Tuesday, the host system 200 can achieve the adjustment described above by reflecting the following condition in the setting values that the day to which the operating status monitoring period belongs is every Monday.

The adjustment described above may be achieved by carrying out the process of adding a new operating status monitoring period B6, which is the day before the day to which the measurement start time belongs, without changing the aforementioned setting itself in which the operating status monitoring period is every Wednesday. In this case, the time synchronization may be performed in the operating status monitoring period B6.

The day to which the operating status monitoring period in which the time synchronization is performed belongs is thus adjacent to the day to which the measurement period belongs, whereby the measurement period can be more accurately started.

Further, the case where the communication circuit 125 receives information corresponding to one month in one receipt process has been presented. For example, in a given activation period, the communication circuit 125 receives information to be used in the next one measurement period and information to be used in the next four operating status monitoring periods. It is, however, noted that the communication circuit 125 may receive a greater amount of information in one receipt process. For example, the communication circuit 125 may receive information corresponding to M months in a given activation period. M is an integer greater than or equal to two. For example, in a given activation period, the communication circuit 125 receives information to be used in the next M measurement periods and information to be used in the next 4×M operating status monitoring periods. The number of times of the receipt of the measurement start time information, the operating status monitoring time information, and the communication start time information and the number of times of the setting can thus be reduced. It is, however, desirable that the reference time information is received at a high frequency to some extent in consideration of the time error of the time information from the clocking circuit 113.

When information corresponding to M months is received, the measurement start time information may be information that specifies the measurement start time corresponding to each of M times, for example, information including M pieces of information that each specify a year, a month, a day, an hour, a minute, and a second. The measurement start time information may instead be information, such as "10 A.M. on the first day of every month". The same applies to the communication start time information. The operating status monitoring time information may be a set of pieces of information that each specify a year, a month, a day, an hour, a minute, and a second or may, for example, be "midnight every Wednesday". When "10 A.M. on the first day of every month", "midnight every Wednesday", or any other information is used, the period for which the information is used may be variable. For example, the sensing apparatuses 100 may continuously use the received information unless the host system 200 instructs a change in the measurement start time information or any other information.

In the above description, the case where the received information is used in the closest measurement period has been presented. Instead, the measurement start time information and the communication start time information received in a given activation period may not be used in the next measurement period but may be used in the measurement period next to the next measurement period or any of the following measurement periods. The same applies to the operating status monitoring time information and the communication start time information.

In addition, a variety of changes can be made to the timing at which the measurement start time information or any other information is received and the timing at which the received information is used.

2.4 Initialization Process

As described above, in the approach of the present embodiment, after the power supply circuit 111 is activated by the alarm output from the clocking circuit 113, Vdd supplied from the power supply circuit 111 causes the processing circuit 121 to start operating. The timing at which the alarm output from the clocking circuit 113 is turned on is determined, for example, by the measurement start time set by the processing circuit 121. Therefore, in the state in which the processing circuit 121 has not performed the settings, the clocking circuit 113 does not output the alarm, so that the power supply circuit 111 is not activated. Further, since the processing circuit 121 does not operate in the state in which the power supply circuit 111 is not activated, the processing circuit 121 cannot set the clocking circuit 113. As a result, the sensing apparatuses 100 cannot start operating.

Therefore, in the present embodiment, the initialization process may be carried out separately from the processes shown in FIGS. 5, 6, and 8. The initialization process is, for example, a process carried out before a sensing apparatus 100 is installed at a target object.

Figure 9:
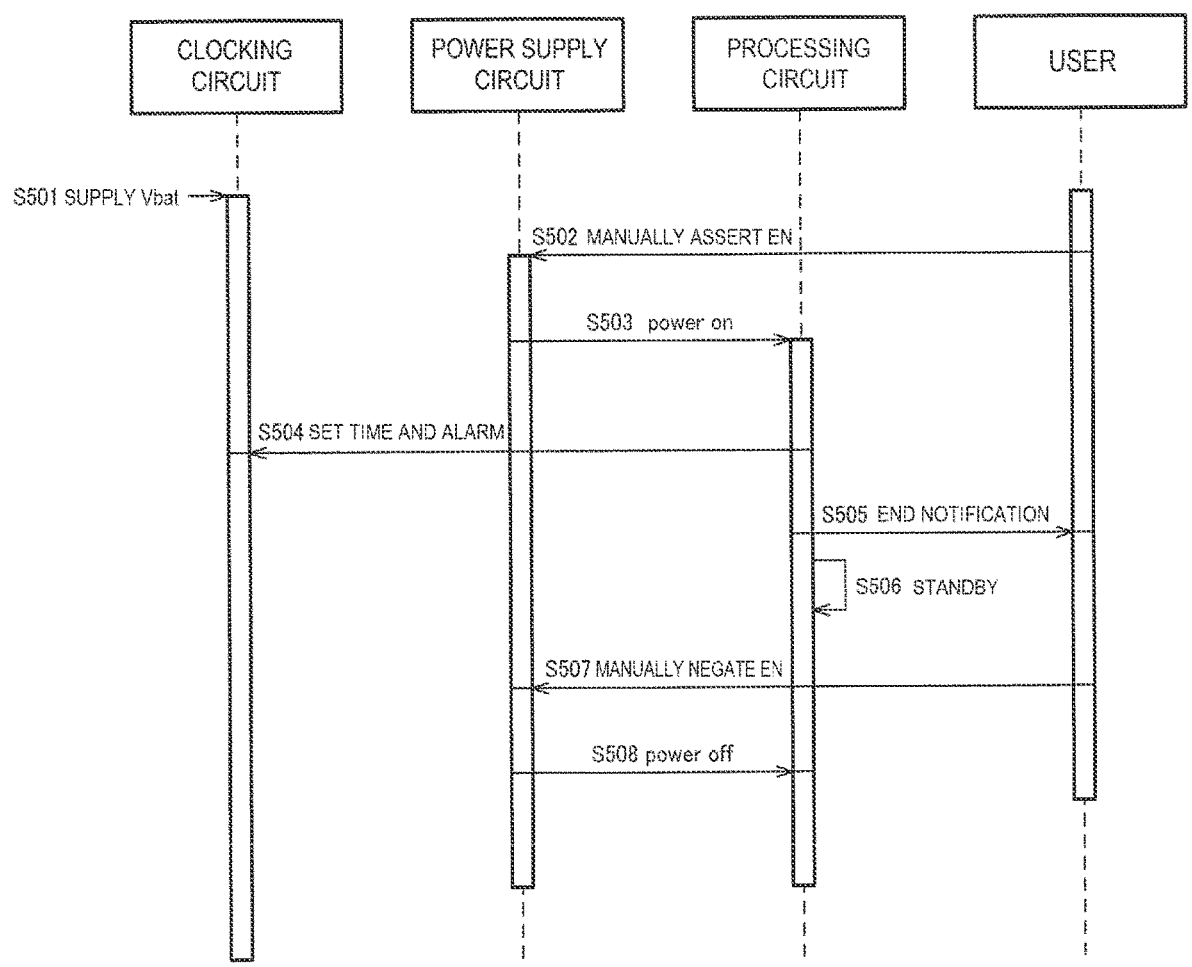
FIG. 9 describes the procedure of an initialization process.

FIG. 9 describes the procedure of the initialization process. When the initialization process starts, the battery BAT is first coupled to the sensing apparatus 100. As a result, Vbat is supplied to the first circuit 110 including the clocking circuit 113 in step S501.

Thereafter, in step S502, a user manually asserts the enable signal for the power supply circuit 111. The process in step S502 is carried out, for example, by using a jumper pin.

When the enable signal is asserted, the power supply circuit 111 outputs Vdd based on Vbat. Specifically, in step S503, the power supply circuit 111 turns on the processing circuit 121 by supplying the processing circuit 121 with Vdd.

In step S504, the processing circuit 121 sets the clocking circuit 113. Specifically, the processing circuit 121 corrects the time information from the clocking circuit 113 based on the reference time information. Further, the processing circuit 121 carries out the process of setting the measurement start time information and the operating status monitoring time information in the clocking circuit 113. The clocking circuit 113 can thus turn on the alarm output at the measurement start time or the operating status monitoring time. The process of setting the correction instruction time shown in FIG. 7 and other figures in the clocking circuit 113 may be further carried out. The process in step S504 is carried out, for example, by using the external information processing apparatus coupled via the interface 127 in FIG. 2. For example, the user causes the processing circuit 121 to set the clocking circuit 113 by causing the information processing apparatus, such as a PC (personal computer), to transmit a command. The command includes a command for setting the communication start time information in the sensing apparatuses 100. For example, in step S504, the storage 129 stores the communication start time information inputted via the interface 127.

In step S505, the processing circuit 121 transmits to the information processing apparatus a notification stating that the setting of the clocking circuit 113 has been completed. The process in step S505 is carried out via the interface 127, as in step S504. For example, the processing circuit 121 transmits the end notification in step S505 as a response to the command inputted from the information processing apparatus. After step S505, the processing circuit 121 carries out a STANDBY preparation process in step S506.

Having received the end notification, the user manually negates the enable signal for the power supply circuit 111 in step S507. The process in step S507 is carried out, for example, by using a jumper pin, as in step S502. When the enable signal is negated, the power supply circuit 111 stops outputting Vdd based on Vbat. Specifically, in step S508, the power supply circuit 111 turns off the processing circuit 121 by stopping supplying the processing circuit 121 with Vdd.

The measurement start time and other pieces of information are set in the clocking circuit 113 by carrying out the initialization process shown in FIG. 9. The processes shown in FIGS. 5, 6 and 8 can thus be appropriately carried out. Further, at the end of the processes in FIG. 9, neither the power supply circuit 111 nor the processing circuit 121 is in operation, whereby the power consumption can be reduced.

The processing circuit 121 may determine the process performed when processing circuit 121 receives the supplied Vdd and starts operating, the initialization process, the measurement process, or the operating status monitoring process. For example, the storage 129 stores an initialization completion flag. For example, when the initialization completion flag is off, the processing circuit 121 carries out the process of accepting a command from the external information processing apparatus. The initialization process shown in FIG. 9 can thus be appropriately carried out. When the initialization process is carried out, the user carries out the process of turning on the initialization completion flag, for example, by using a command from the information processing apparatus. When the initialization completion flag is on, the processing circuit 121 carries out the measurement process or the operating status monitoring process. The processing circuit 121 determines the process to be carried out, the measurement process or the operating status monitoring process, by comparing the current time with the measurement start time and the operating status monitoring time. The processing circuit 121 can thus carry out an appropriate process according to the situation. Similarly, the processing circuit 121 may be configured to further determine whether to carry out the process at the correction instruction time shown in FIG. 8.

3. Application Example of Sensing Apparatus 100 and Sensing System 10

Figure 10:
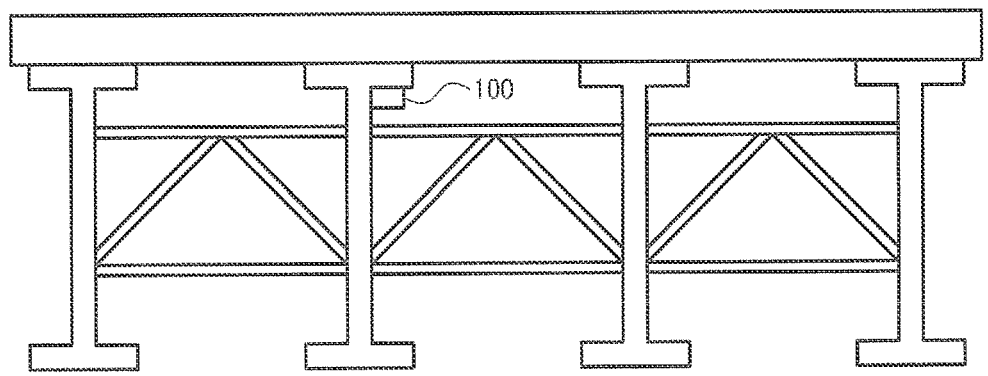
FIG. 10 describes an application example of the sensing apparatus.

The sensing apparatuses 100 according to the present embodiment each detect, for example, a physical quantity representing the deformation of a structure when a moving body moves along the structure. The structure is, for example, a bridge, as shown in FIG. 10. A sensing apparatus 100 is disposed in a given position on the bridge and detects deformation of the bridge when the moving body moves on the bridge. The moving body may be a train, an automobile, or any other moving body. The structure is not limited to a bridge and can be extended to other artificial structures, such as a building, a road, a tower, a utility pole, and a dam. The structure may include a natural structure, such as a mountain, a river, and a cliff. The moving body is not limited to an object that moves on the structure and may move in the vicinity of the structure. For example, a building constructed in the vicinity of a railroad track may be the structure according to the present embodiment, and the sensing apparatus 100 may detect vibration or displacement of the building when a train passes along the railroad track.

The sensing apparatus 100 may be used for maintenance of a machine installed, for example, in a factory. For example, the sensing apparatus 100 measures, for example, displacement that occurs when an instrument having a movable portion operates. The machine used herein may, for example, be a manufacturing apparatus used to manufacture a product or a machine for packaging or any other purpose. The machine may instead be a robot having an arm and an end effector. The target of the maintenance is not limited to a machine and may be an environment in which the machine is installed, for example, a floor or a wall surface.

The present embodiment has been described above in detail, and a person skilled in the art will readily appreciate that a large number of variations are conceivable to the extent that they do not substantially depart from the novel items and effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, all combinations of the present embodiment and the variations fall within the scope of the present disclosure. Moreover, the configuration, operation, and other factors of each of the sensing apparatuses, the sensing system, and the like are not limited to those described in the present embodiment and can be changed in a variety manners.

What is claimed is:

1. A sensing apparatus comprising:
a sensor;
a processing circuit that is configured to acquire sensor output information from the sensor;
a communication circuit that is configured to transmit transmission information corresponding to the sensor output information and receive first time information for correction before the processing circuit starts acquiring the sensor output information;
a clocking circuit that is configured to generate second time information and correct the first time information using the first time information for correction received by the communication circuit, and
a power supply circuit that supplies the processing circuit with power supply voltage based on battery voltage from a battery,
wherein the processing circuit is configured to start acquiring the sensor output information based on the corrected second time information,
the clocking circuit operates by using the battery voltage,
the power supply circuit is activated by an instruction from the clocking circuit,
the processing circuit starts acquiring the sensor output information after the power supply voltage is supplied from the activated power supply circuit, and wherein
the power supply circuit is activated by a first activation instruction from the clocking circuit and supplies the processing circuit with the power supply voltage in a first period,
the communication circuit receives the first time information for correction in the first period,
the clocking circuit corrects the first time information using the first time information for correction in the first period,
the power supply circuit stops operating in response to a first stop instruction from the clocking circuit,
the power supply circuit is activated by a second activation instruction from the clocking circuit and supplies the processing circuit with the power supply voltage in a second period, and
the processing circuit acquires the sensor output information in the second period.

2. The sensing apparatus according to claim 1, wherein the first period is an operating status monitoring period that is a period for checking whether or not the sensing apparatus is operating normally.

3. The sensing apparatus according to claim 1,
the communication circuit receives the first time information for correction after the power supply circuit is activated,
the clocking circuit corrects the first time information using the first time information for correction, and
the processing circuit acquires the sensor output information after the clocking circuit corrects the first time information.

4. The sensing apparatus according to claim 1,
wherein the communication circuit receives measurement start time information, and
the clocking circuit activates the power supply circuit at the measurement start time specified by the measurement start time information.

5. The sensing apparatus according to claim 1,
wherein the processing circuit operates in a low power consumption mode after the clocking circuit corrects the first time information but before the processing circuit starts acquiring the sensor output information.

6. A sensing system comprising:

the sensing apparatus according to claim 1; and a host system, wherein the host system predicts a time error that is an error of the second time information in the sensing apparatus and activates the power supply circuit of the sensing apparatus at a time at least earlier than a period of the time error.

7. The sensing system according to claim 6, wherein the host system adjusts a day to which an operating status monitoring period belongs to a day before a day to which a measurement period belongs, and transmits the first time information for correction in the operating status monitoring period, wherein the operating status monitoring period is a period for checking whether or not the sensing apparatus is operating normally.

8. A sensing apparatus comprising:

a sensor;

a processing circuit that is configured to acquire sensor output information from the sensor;

a communication circuit that is configured to transmit transmission information corresponding to the sensor output information and receive first time information for correction before the processing circuit starts acquiring the sensor output information;

a clocking circuit that is configured to generate second time information and correct the first time information using the first time information for correction received by the communication circuit, and a power supply circuit that supplies the processing circuit with power supply voltage based on battery voltage from a battery, wherein the processing circuit is configured to start acquiring the sensor output information based on the corrected second time information, the clocking circuit operates by using the battery voltage, the power supply circuit is activated by an instruction from the clocking circuit, the processing circuit starts acquiring the sensor output information after the power supply voltage is supplied from the activated power supply circuit, and wherein the power supply circuit is activated by a first activation instruction from the clocking circuit and supplies the processing circuit with the power supply voltage in a first period, the communication circuit receives the first time information for correction in the first period, the clocking circuit corrects the first time information using the first time information for correction in the first period, the power supply circuit stops operating in response to a first stop instruction from the clocking circuit, the power supply circuit is activated by a second activation instruction from the clocking circuit and supplies the processing circuit with the power supply voltage in a second period, the processing circuit acquires the sensor output information in the second period, and wherein the first period is an operating status monitoring period that is a period for checking whether or not the sensing apparatus is operating normally.

* * * * *